United States Patent [19]

Ferrell et al.

[11] Patent Number: 4,790,406
[45] Date of Patent: Dec. 13, 1988

[54] ANTI-THEFT DEVICE FOR AN AUTOMOBILE

[76] Inventors: Richard A. Ferrell, Rte. 3, Box 67, Mounds, Okla. 74045; Edgar E. Spurgeon, 15002 N. Trenton, Skiatook, Okla. 74070

[21] Appl. No.: 119,713
[22] Filed: Nov. 12, 1987
[51] Int. Cl.$^4$ .............................................. B60R 25/04
[52] U.S. Cl. ...................................................... 180/287
[58] Field of Search ................... 180/287; 70/252, 254

[56] References Cited

U.S. PATENT DOCUMENTS

| | | | |
|---|---|---|---|
| 1,956,438 | 4/1934 | Eichenauer | 70/90 |
| 2,147,413 | 2/1939 | Sandberg | 70/254 |
| 2,147,613 | 2/1939 | Sandberg | 70/254 |
| 2,234,010 | 3/1941 | Sandberg | 70/254 |
| 2,890,581 | 6/1959 | Lewis | 180/287 |
| 3,021,913 | 2/1962 | Ouimet et al. | 180/287 |
| 3,553,986 | 1/1971 | Ball et al. | 180/287 |
| 3,665,738 | 5/1972 | Pescuma et al. | 70/211 |
| 3,811,303 | 5/1974 | Robertson | 70/237 |
| 3,948,069 | 4/1976 | Imbriano | 70/428 |
| 4,020,662 | 5/1977 | Fowler | 70/237 |
| 4,062,193 | 12/1977 | Deleto | 70/18 |
| 4,098,102 | 7/1978 | Kalina | 70/237 |
| 4,167,222 | 9/1979 | Bindari | 180/287 |
| 4,282,769 | 8/1981 | Sandrock | 180/287 |
| 4,313,520 | 2/1982 | Chester | 180/287 |
| 4,598,562 | 7/1986 | Freeman | 70/237 |

*Primary Examiner*—Kenneth R. Rice
*Attorney, Agent, or Firm*—Head & Johnson

[57] ABSTRACT

A stainless steel defender shield is permanently fixed to the shift bowl of the steering column of an automobile. When assembled on a steering column the defender shield moves with the shift bowl when the gear shift is moved. A lock assembly with deadbolt is provided on the defender shield with this deadbolt mounted for radial movement with respect to the shield. The lock is positioned such that when the car is in the park position the deadbolt enters the gate of the shift device at a position such that the gear lever cannot be moved out of the park position.

5 Claims, 4 Drawing Sheets

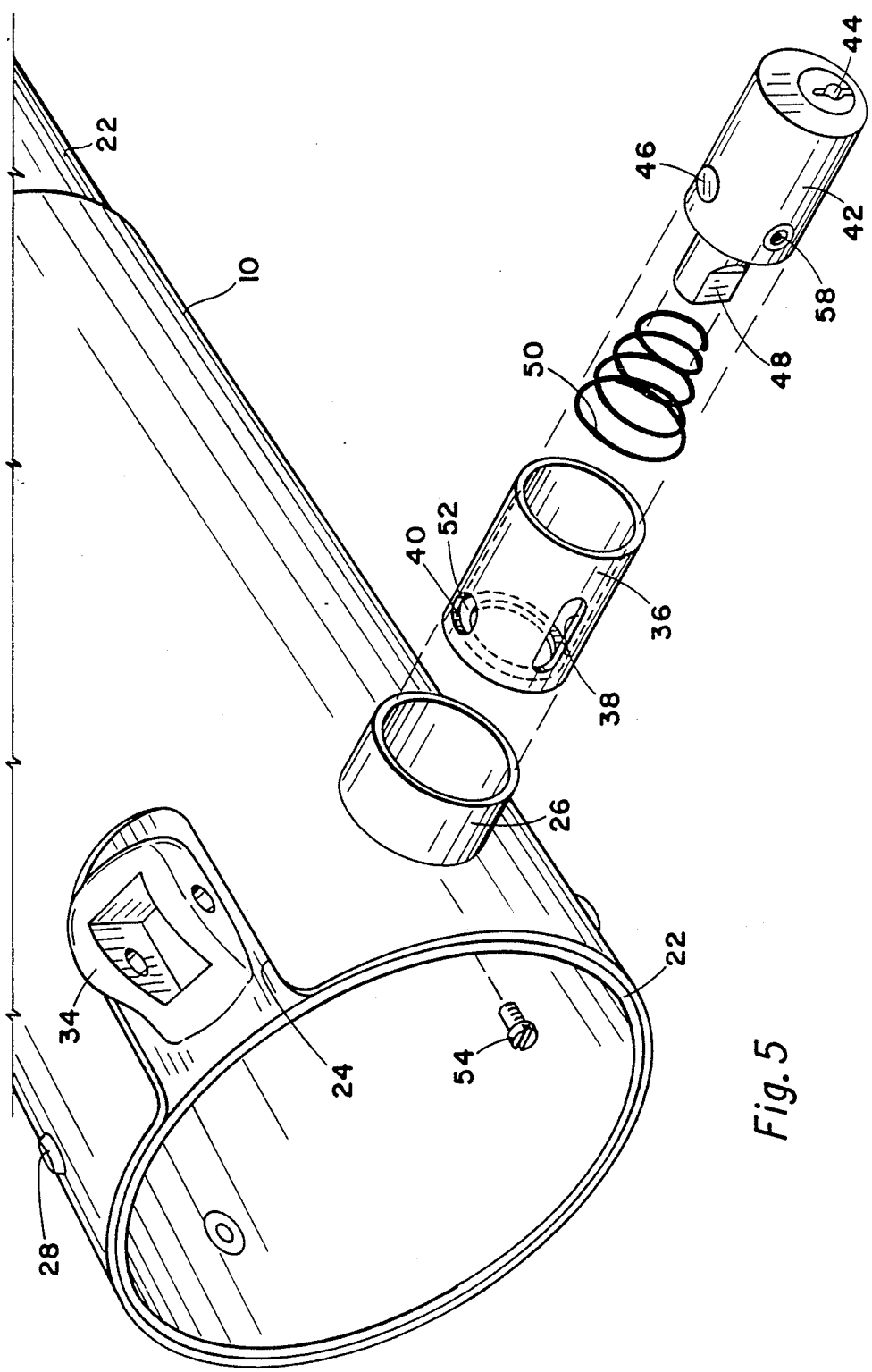

ANTI-THEFT DEVICE FOR AN AUTOMOBILE

BACKGROUND OF THE INVENTION

1. Field of the Invention

The present invention relates to automotive vehicle security and, more particularly, to the preventing of the theft of automotive vehicles particularly of the type having a shifting lever mounted on the steering column below the steering wheel.

2. The Prior Art

Most automobiles today have a steering wheel on a steering column and positioned at the right of the steering column below the steering wheel is an ignition lock. Below the ignition lock there is a shift bowl through which a shift lever extends. The shift lever and the shift bowl turn together. The shift lever typically places the car in either a park, reverse, neutral or drive position. The gear lever has limited movement about the steering column from the park position to the lower drive position. The various positions are controlled by a "gate". The ignition lock is intended to prevent burglary, however, they can be forceably detached from the steering column in such a way as to expose ignition terminals and to permit unauthorized starting of the vehicle engine. Once the vehicle engine is started in a typical car, the shift lever can be moved to reverse or to one of the drive positions and can be stolen.

Various attempts have been made to prevent the theft of automobiles. Many of these are directed toward preventing entry into the ignition lock or to prevent tampering with the ignition lock on the automobile steering column and many includes a collar and a cap or the like. These are concerned with preventing the starting of the automobile.

In many cars the components surrounding the steering column are made of plastic or an aluminum alloy which are easily broken away. A thief can, by using an ordinary screw driver, tear away the shift bowl or mask jacket around the steering column and readily ignite the engine.

SUMMARY OF THE INVENTION

A primary object of this invention is to secure the shift lever in the park position on an automobile, with or without the automobile motor running, so as to prevent unauthorized moving or driving of the vehicle. A high quality stainless steel shield is provided and fits snugly over the shift bowl on the steering column of a typical automobile. The stainless steel shield is riveted to the shift bowl and as the shift bowl moves upon shifting the automobile, the shield likewise rotates. A deadbolt lock is provided through the wall of the shield such that the deadbolt has radial movement in and out with respect to the shield. The deadbolt lock is positioned on the shield such that when the shift lever is in the park position which is at one end of the gate, the deadbolt lock is at the other end of the gate. When in this position, and the lock is activated, the dead bolt extends into the other end of the gate so that the lever cannot be shifted out of the park position. The car can be started while the car is locked in part position, but it cannot be driven anywhere. Two keys are required to drive the car. One is the ignition key to start the car, the second key is the key to remove the deadbolt from its locked position in the gate.

DESCRIPTION OF THE DRAWINGS

FIG. 5 shows the defender shield of my invention mounted about a shift bowl and with the lock mechanism in exploded view.

DETAILED DESCRIPTION

Figure 1:
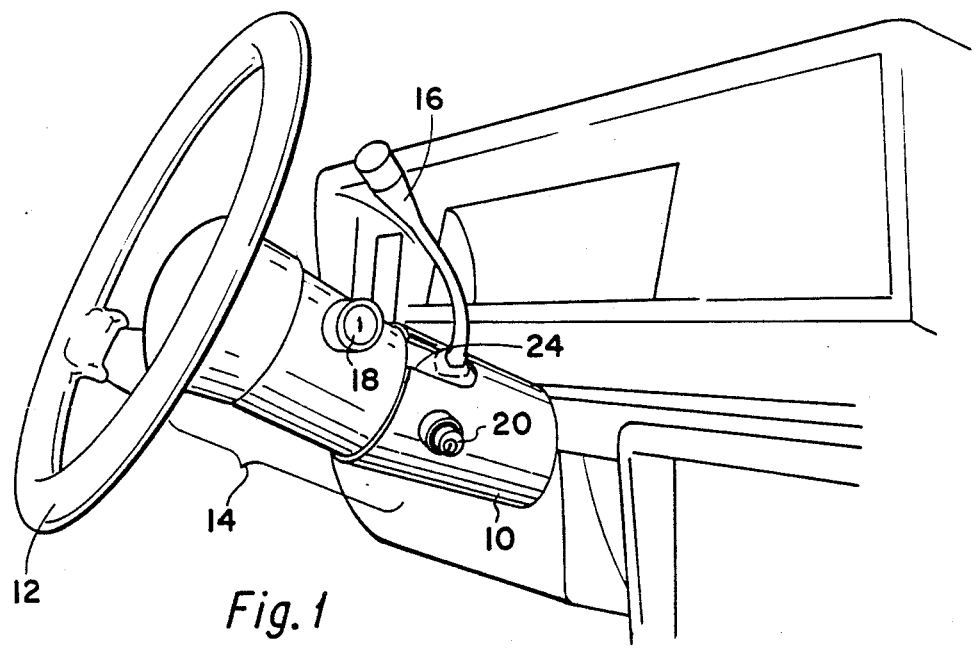
FIG. 1 shows our defender shield mounted about the shift bowl which is mounted beneath a steering wheel on a steering column in an automobile.
Figure 6:
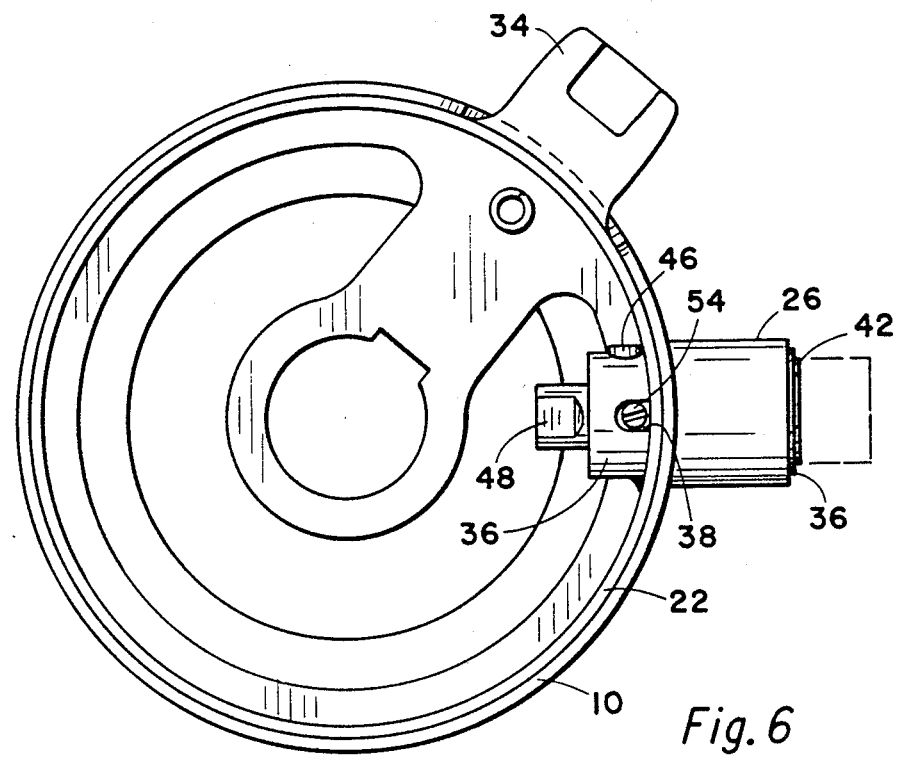
FIG. 6 is an end view showing our defender shield mounted on a shift bowl.
Figure 4:
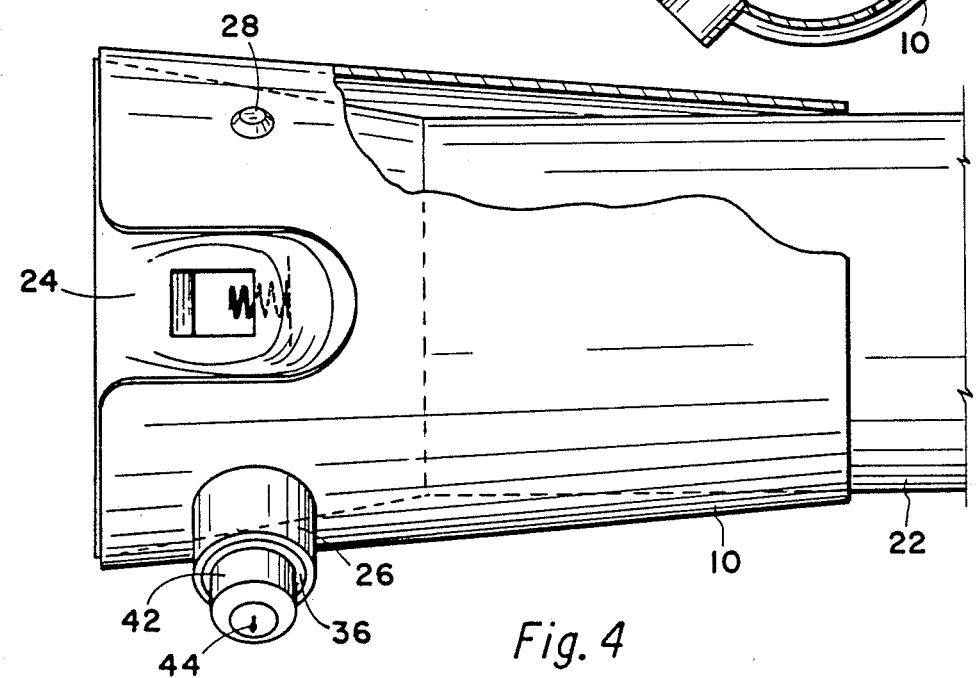
FIG. 4 illustrates the defender shield of FIG. 2 with lock installed and mounted about a shift bowl.

Attention is first directed to FIG. 1 which shows a steering wheel 12 mounted on a steering column in a common fashion on an automobile. Beneath the steering wheel is a mask jacket 14 and an ignition switch 18. A part of the mask jacket is shift bowl 22 which is shown in FIGS. 4, 5 and 6. Mounted about the steering column and about the shift bowl 22 is a defender shield 10. The defender shield 10 has a notch 24 into which shift lever 16 fits. The defender shield 10 has a defender lock 20. The defender shield is made of a very hard material and is preferably made of #304 16 gauge stainless steel. This material is virtually impossible to cut with a torch and is nearly impenetrable protection.

Figure 2:
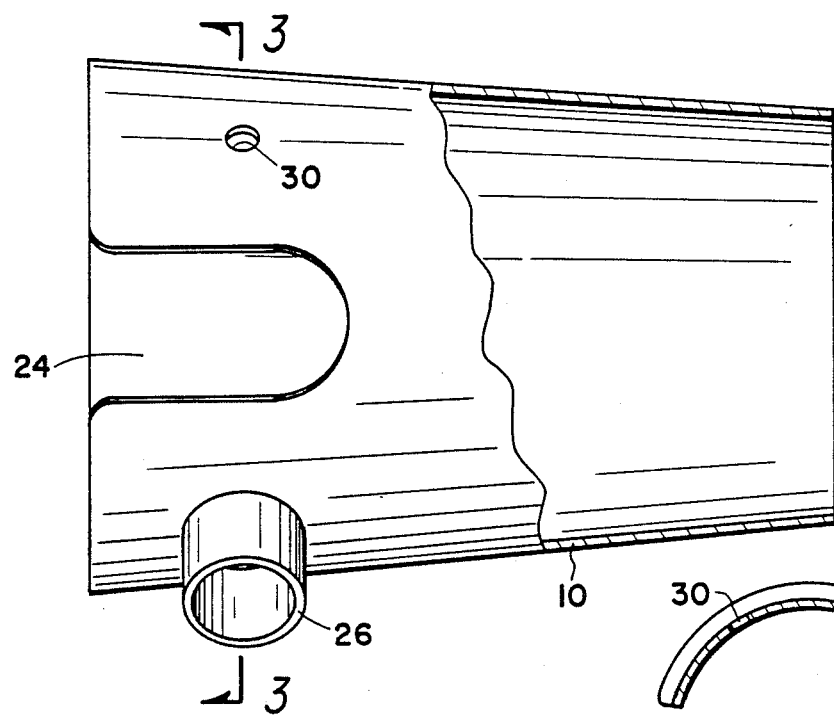
FIG. 2 is a view of the shift bowl shield or defender shield before the lock is installed.
Figure 3:
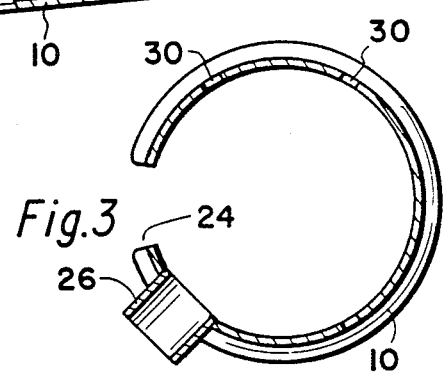
FIG. 3 is a view taken along the line 3—3 of FIG. 2.

Attention is next directed to FIG. 2 which shows the defender shield 10 with lever lock notch 24. The shape of the shield 10 is such that it fits snugly over the shift bowl and is typically frusto-conically shaped. The defender shield 10 is provided with a lock tube 26. As shown in FIG. 4 the shift bowl 22 and defender shield 10 are secured together by rivets 28. Thus when in the unlocked position the movement of the shift lever 16 causes the shift bowl 22 and the defender shield 10 to rotate in unison about the steering column within the normal limits of rotation. The rivets 28 fits through holes 30 as shown in FIGS. 2 and 3. As shown in FIG. 4 the defender shield 10 fits over shift bowl 22 and at the top or near slot 24 the outside periphery of the shift bowl 22 fits neatly with the inside of the defender shield 10. The lower end or right end of the defender shield 10 also fits snugly against the lower portion of the shift bowl 22.

Figure 9:
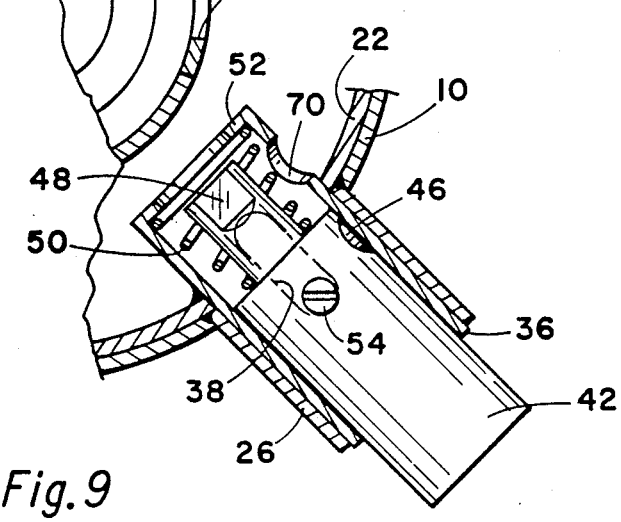
FIG. 9 is similar to FIG. 7 but with the deadbolt lock disengaged from the gate so that the shift lever can shift out of park.

Attention is next directed to FIG. 5 which shows a lock in an exploded view. The defender shield 10 is riveted to the shift bowl 22 with the lever bracket 34 extending through the notch 24. Insofar as the lock is concerned, there is shown a sleeve or casing 36 with a guide slot 38 and a lock pin hole 40. A lock cylinder 42 is shown and has a key slot 44 and a pop out pin 46 and a bolt 48. A spring 50 is provided between lock cylinder 42 and an annular lip 52 within sleeve 36. A set screw 54 is also provided. When assembled the spring 50 and lock cylinder 42 extend into sleeve 36 and is held there by set screw 54 extending through guide slot 38 and into threaded hole 58. When assembled to lock appears as it does in FIG. 4. As shown in FIG. 9 sleeve 52 is welded or otherwise secured to shield 10.

Attention is next directed to FIG. 9 which shows lock 20 in the unlocked position. Lock cylinder 42 is in its extreme unlocked position and set screw 54 is in the extreme radially outward position of slot 38. By extreme position is meant the farthest possible radial position with respect to the steering wheel. Lock or pop out pin 46 is within sleeve 52 and cylinder 52 has been extended by spring 50.

Figure 7:
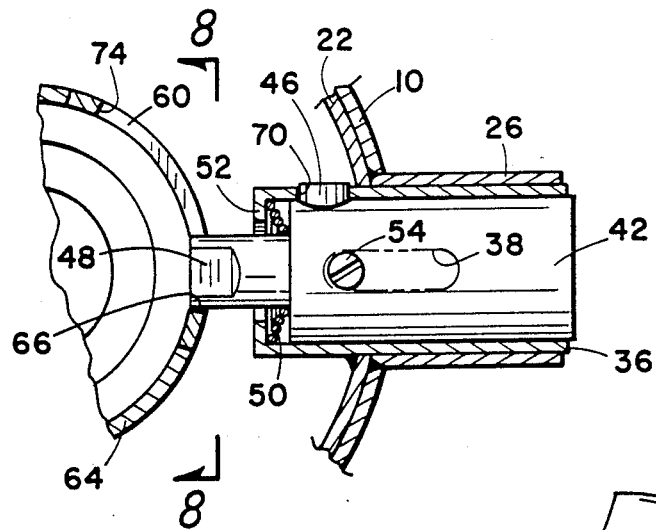
FIG. 7 shows a fragmentary view of our defender shield and shift bowl with the lock extended into the gate of the gear control mechanism.
Figure 8:
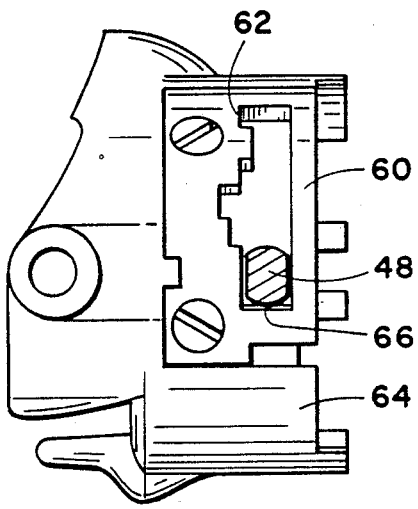
FIG. 8 is a view taken along the line 8—8 of FIG. 7.

Attention is now directed to FIG. 8 which shows the gate 60 of a typical gear positioning mechanism of an automobile. On the upper end of the gate is a park position 62. The gate 60 is secured to tilt housing anchor 64. Thus, gate 60 and tilt housing anchor 64 are fixed with respect to the steering column. That is, they do not rotate about it. The rotation is by shift lever 16 which rotates the shift bowl 22 and may be moved from the park position 62 to the various neutral and reverse and drive positions. Bulkhead 66 or wall 66 of the gate 60 is also fixed. Wall 66 is the extreme gate position from the park position. It is against this wall 66 that deadbolt lock 48 abuts when in the locked position as shown in FIG. 8. This locked position is shown in FIG. 7 which is similar to FIG. 9 except deadbolt lock 48 has been extended into the position as shown in FIG. 7. When in this position the shift lever 16 is locked in the park gear and cannot be moved. The reason for this is that bolt 48 has been moved to the position shown in FIG. 8. Gate 60 is fixed and shift lever 16 is fixed in position with respect to bolt 48. If bolt 48 cannot rotate downwardly because of wall 66 then the shift lever 16 cannot rotate. When in the position shown in FIG. 7 lock pin 16 extends outwardly into slot 70 as clearly shown in FIG. 7. When lock 20 is unlocked then the shift lever can be moved between bulkhead 74 and 66 as indicated in FIG. 9 so that the drive mechanism may be shifted from park, reverse, neutral and to the various drive positions.

When it is desired to place the "defender" on an automobile, the steering column is dismantled down to the shift bowl. This is an operation which a well qualified mechanic can perform. The shift bowl is removed and the defender shield attached to it. What normally happens though is that a group of shift bowls to fit the various automobiles with defender shield attached are kept in stock. In this case when the shift bowl has been removed one merely places the modified shift bowl with defender shield secured thereon onto the steering column and then completely reassemble the steering wheel and other parts of the column. The security system of the defender shield is now in place. All that needs to be done to activate it is to place the car shift lever into the park position and then push in on the end of lock cylinder 42. The pop out pin 46 enters lock pin hole 40 and the bolt 48 is in the position shown in FIG. 8 in the lowermost position from the shift lever within the gate 60. When the bolt 48 is in its position the shift lever cannot be moved. However, the car can be started. One may take a key and insert it into the ignition key switch and start the car. One can leave the car running in this position and with the key to the lock 20 removed the security system is in place. In other words one may leave the ignition key in the car with the motor running and take the defender key with the operator. The defender shield is a stainless steel shift bowl cover with a locking key, which prevents a thief from getting to an ignition rod to start the car. The defender shield is made preferably of number 304 16 gauge stainless steel which is very difficult to break into because it cannot be cut with a torch and it is nearly impenetrable to tools. Certainly a screw driver which has been used many times on unprotected cars to break open the shift bowl is ineffective against the defender shield of this invention. Several hundred of these defenders have been installed in cars. To our knowledge none of these cars has been stolen. It is assumed that thieves understand what the defender is and when they look through a car window and see that defender shield in place they will know that they are looking at something very special. Apparently, most thieves are smarter than to try and break into a car with the defender shield in place.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What we claim is:

1. A defender shield for use with an automobile having a steering wheel on a steering column on which is mounted a shift bowl with lever bracket which comprises:
   a frusto-conical shaped member having a notch in one end through which the lever bracket of said shift bowl may extend;
   a lock tube extending outwardly from said member and circumferentially spaced from said notch, the axis of said lock tube extending radially with respect to said frusto-conical shaped member;
   a bolt lock inserted in said lock tube.

2. A security system for aiding in the prevention of theft of an automobile which has a steering wheel connected to a steering column on which is rotatably mounted a shift bowl surrounding a gate having a park position which comprises:
   a hard shield mounted about said shift bowl in a non-movable relation; and
   locking means having a bolt and attached to said shield and operable to move radially to engage said gate to prevent the rotation of said shift bowl such that said lever can be locked in the part position.

3. A security system as defined in claim 2 in which said shield is made of 304 16 gauge stainless steel.

4. An anti-theft device for attaching over the shift bowl of the steering column of an automobile having a gate for controlling the gear system which comprises:
   a shift bowl having a bracket for connection to a shift lever;
   a defender shield enclosing at least a part of and rigidly attached to said shift bowl and having a notch through which said bracket may extend;
   locking means secured to said shield and having a radially inwardly extending bolt which may be extended into said gate to prevent the rotation in one direction of said shift bowl about said gate.

5. A security system for use with an automobile having a steering wheel, a steering column and a gear system which comprises:
   a shift bowl mounted about said steering column and rotatable in relation thereto between a first and a second position, said bowl having a bracket for connecting to a shift lever;

a gate for controlling the gear system, said gate having a park position at one end and an opposite end and supported within said bowl by said steering column;

a symmetrically shaped defender shield fitting snugly over and fixed to said shift bowl such that as said shift bowl moves said defender shield moves, said shield having a notch through which said bracket may extend;

a locking tube extending outwardly from said member and circumferentially spaced from said notch, the axis of said lock tube extending radially with respect to said defender shield;

a bolt lock inserted in said lock tube and arranged such that when activated will contact the other end of said gate to prevent rotation of said defender shield and shift bowl which will maintain the shift lever in the parked position, said locking tube is arranged with respect to said notch so that said bolt lock can enter said gate only when said shift lever is in the park position.

* * * * *